United States Patent
Wiedemann et al.

(10) Patent No.: US 7,406,832 B2
(45) Date of Patent: Aug. 5, 2008

(54) APPARATUS AND METHODS FOR DISINFECTING COMPONENTS OF AN AIR CONDITIONING SYSTEM IN A MOTOR VEHICLE

(75) Inventors: Stefan Wiedemann, Munich (DE); Dieter Schlenz, Kottgeisering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/602,972

(22) Filed: Nov. 22, 2006

(65) Prior Publication Data

US 2007/0062204 A1     Mar. 22, 2007

Related U.S. Application Data

(63) Continuation of application No. PCT/EP2005/005515, filed on May 20, 2005.

(30) Foreign Application Priority Data

May 25, 2004  (DE) ................. 10 2004 025 461
Jun. 26, 2004  (DE) ................. 10 2004 030 998

(51) Int. Cl.
*F24F 3/16*       (2006.01)
(52) U.S. Cl. ............................... 62/78; 62/264
(58) Field of Classification Search ............... 62/78, 62/264; 422/121
See application file for complete search history.

(56) References Cited

U.S. PATENT DOCUMENTS

| 5,899,082 A | 5/1999 | Stein et al. |
| 2005/0169821 A1 | 8/2005 | Boschert et al. |

FOREIGN PATENT DOCUMENTS

| DE | 196 06 412 A1 | 8/1997 |
| DE | 196 51 403 A1 | 6/1998 |
| DE | 102 13 195 A1 | 10/2003 |
| JP | 8-258562 A | 10/1996 |
| JP | 2002-103959 A | 4/2002 |
| WO | WO 03/080375 A1 | 10/2003 |

OTHER PUBLICATIONS

German Search Report dated Jul. 7, 2006 including English translation of pertinent portion (Eleven (11) pages).
International Search Report dated Aug. 22, 2005 including English translation (Four (4) pages).

*Primary Examiner*—Melvin Jones
(74) *Attorney, Agent, or Firm*—Crowell & Moring LLP

(57) ABSTRACT

A device for disinfecting components of an air conditioning system in a motor vehicle is provided. The device includes an ozone generator arranged in close proximity to an evaporator in the air conditioning system. The device further includes an electronic control unit configured to activate the ozone generator to produce a comparatively large amount of ozone sufficient to disinfect the evaporator. The electronic control device activates the ozone generator when information provided to the control unit indicates that a condition is met, under which air flaps between the air conditioning system and a passenger compartment of the motor vehicle may remain closed or are expected to remain closed for a time sufficient for the disinfection.

22 Claims, 1 Drawing Sheet

APPARATUS AND METHODS FOR DISINFECTING COMPONENTS OF AN AIR CONDITIONING SYSTEM IN A MOTOR VEHICLE

This application is a continuation of PCT International Application No. PCT/EP2005/005515, filed May 20, 2005, which claims priority under 35 U.S.C. § 119 to German Patent Application No. 10 2004 025 461.3 filed May 25, 2004, and to German Patent Application No. 10 2004 030 998.1 filed Jun. 26, 2004, the entire disclosures of which are herein expressly incorporated by reference.

BACKGROUND AND SUMMARY OF THE INVENTION

The present invention relates generally to motor vehicles and, more particularly, to a device for disinfecting components of an air conditioning system, including an evaporator.

A known device for cleaning breathing air in a motor vehicle is disclosed in connection with the system described in the DE 196 51 403 A1. This system focuses predominantly on cleaning the breathing air in the passenger compartment while the motor vehicle is running.

The problem with the aforementioned device is metering the correct amount of ions and/or ozone. If the amount of ions and/or ozone is too small, the effect of the device is inadequate. If the amount of ions and/or ozone is too large, it may have a disturbing effect on the passengers. Such conventional devices are thus deficient in their ability to assure, on the one hand, reliable disinfection and, on the other hand, not to impair the well-being of the passengers.

Systems, apparatus, and methods consistent with the present invention may obviate one or more of the above and/or other issues.

Consistent with the present invention, a device for disinfecting components of an air conditioning system in a motor vehicle may be provided. The device may comprise: an ozone generator arranged in close proximity to an evaporator in the air conditioning system; and an electronic control unit configured to activate the ozone generator to produce a comparatively large amount of ozone sufficient to disinfect the evaporator, when information provided to the control unit indicates that a condition is met, under which air flaps between the air conditioning system and a passenger compartment of the motor vehicle may remain closed for a time sufficient for the disinfection.

Consistent with the present invention, a method for disinfecting components of an air conditioning system in a motor vehicle may be provided. The method may comprise: determining a condition under which air flaps between the air conditioning system and a passenger compartment of the motor vehicle may remain closed for an amount of time sufficient to disinfect the air conditioning system; and when the condition is met, inducing a first amount of ozone in the air conditioning system, the first amount of ozone sufficient to disinfect an evaporator of the air conditioning system.

Other objects, advantages and novel features of the present invention will become apparent from the following detailed description of the invention when considered in conjunction with the accompanying drawings.

DETAILED DESCRIPTION OF THE DRAWINGS

Figure 1:
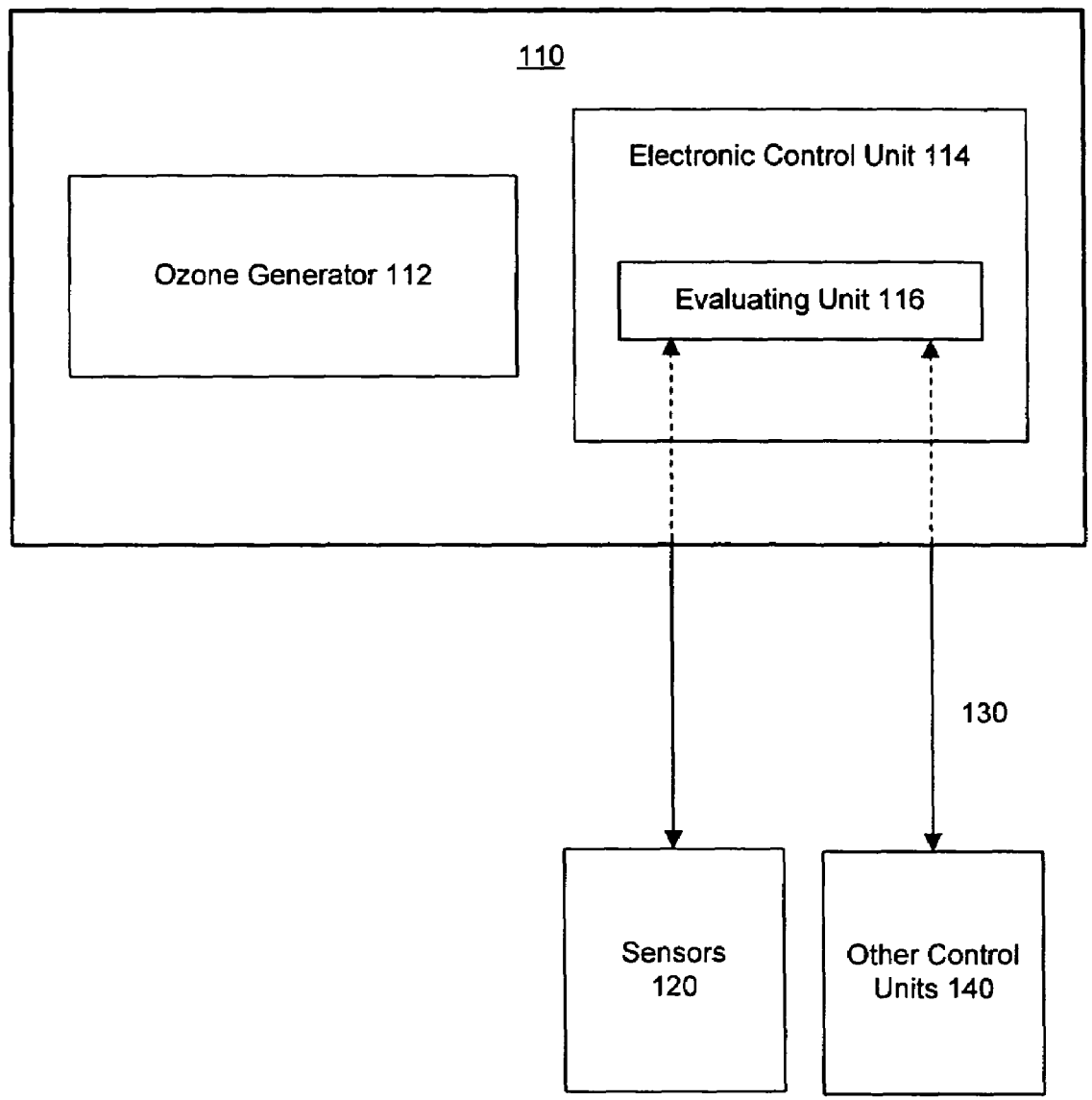
FIG. 1 is a functional block diagram illustrating an exemplary apparatus for disinfecting components of a vehicle air conditioning system, consistent with the present invention.

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

The following discussion focuses on ozone, instead of ions. Ozone is produced by a dielectrically-impeded discharge. Depending on the amount of voltage that is applied, first the ions are produced and then as the voltage increases owing to an electric gas discharge, ozone is produced. In this case, it is assumed that only the ozone results in the components of the air conditioning system, in particular the evaporator, actually being disinfected. The disinfection is achieved by dissolving the generated ozone in the condensate (e.g., on the evaporator) and forming hydroxide radicals that kill germs, fungi, and bacteria.

FIG. 1 is a functional block diagram depicting an exemplary apparatus 110 for disinfecting components of an air conditioning system of a vehicle, consistent with the present invention. The illustrated elements and their configurations are exemplary only. Other variations in the number and arrangement of components are possible, consistent with the present invention. Further, depending on the implementation, certain illustrated elements may be absent and/or additional components not illustrated may be present. In addition, some or all of the functionality of the illustrated components may overlap and/or exist in a fewer or greater number of components than what is illustrated.

As illustrated in FIG. 1, apparatus 110 may include an ozone generator 112, which may be arranged as close as possible to an evaporator (not shown) in a vehicle air conditioning system (also not shown). Ozone generator 112 may be actuated by an electronic control unit 114, which may be integrated, for example, in ozone generator 112 or also in an air conditioner control unit (not shown), which exists in any event.

Consistent with the present invention, electronic control unit 114 may be constructed in such a manner that ozone generator 112 can be activated or switched on to produce a comparatively large amount of ozone. Electronic control unit 114 may activate ozone generator 112 when corresponding information provided to the control unit (e.g., by way of sensors or a databus) indicates that a condition is met, under which air flaps between the air conditioning system and a vehicle passenger compartment may be expected to remain closed or may be closed for a prolonged period of time, i.e., for a time sufficient for disinfection, so that no ozone flows into the passenger compartment.

A comparatively large amount of ozone may include an amount of ozone that guarantees reliable disinfection in a limited amount of time. In contrast, a comparatively small amount of ozone may include an amount of ozone that assures compliance with the maximum allowable limits for the protection of the passengers. Preferably, the air flaps, and in particular the air distribution flaps, and preferably also the circulating air flap, are already closed by control unit 114—if this has not already happened—prior to the production of the comparatively large amount of ozone.

Preferably the condition, under which the air flaps between the air conditioner system and the passenger compartment may be expected to remain closed for a prolonged period of time, is met when the passenger compartment is in an at least a probable unoccupied state. Therefore, control unit 114 may be designed in such a manner that it detects an unoccupied state of the passenger compartment. To this end, control unit 114 may receive the corresponding information as the input signals, for example by means of corresponding sensors 120 or by means of databus connections 130 to other electronic control units 140. The input signals may be processed in a corresponding evaluating unit 116 in control unit 114. The result of this processing is a corresponding actuation of ozone generator 112. To this end, the control unit exhibits, for example, a final step for actuating an electric actuator, included in the ozone generator. If the control unit is not integrated in the ozone generator and if ozone generator 112 itself exhibits its own electronics, the information may also be transmitted to the electronics of ozone generator 112, which decides by itself whether the switching-on condition is met.

For example, control unit 114 may conclude or determine that the passenger compartment is at least probably in an unoccupied state, when a vehicle's internal combustion engine (for example, the ignition, so-called terminal 15) or radio terminal (so-called terminal R) is switched off. Electronic control unit 114 may receive this information from, for example, an electronic control unit 140 of the internal combustion engine via a databus connection 130.

In addition or as an alternative, the control unit of the air conditioning system may conclude or determine that the passenger compartment is at least probably in an unoccupied state, when the central locking system is activated. The control unit receives this information, for example, from an electronic control unit 140 of the central locking system via a databus connection 130.

Furthermore, in addition or as an alternative, the control unit 114 may conclude or determine that the passenger compartment is in an at least probable unoccupied state, when a seat occupant detection system (for example, by video monitoring in the passenger compartment, or the motion alarm of the anti-theft alarm system or by means of pressure sensors in the seats, in particular by means of a sensor unit, which is provided in any event for actuating the airbags) does not detect any passengers. To this end, control unit 114 may be connected, for example, to a seat occupant detection system and/or to another control unit 140 (for example, airbag control unit), in which a seat occupant detection system is integrated, via a databus connection 130.

Another condition, under which the air flaps between the air conditioning system and the passenger compartment may be expected to remain closed for a prolonged period of time, is preferably the switched-off state of the auxiliary ventilating function, the auxiliary heating function, the auxiliary air conditioning function and the residual heat function when the internal combustion engine is switched off.

Another condition, under which the air flaps between the air conditioning system and the passenger compartment may be expected to remain closed for a prolonged period of time, is that auxiliary electric consumers may be activated. This may be determined by information for operating the vehicle electric system.

Another condition, under which the air flaps between the air conditioning system and the passenger compartment may be expected to remain closed for a prolonged period of time, is preferably that the current clock time is in a predetermined time range, such as between 1 and 6 o'clock.

Preferably, when the air flaps are closed, control unit 114 induces the production of a comparatively high amount of ozone for a predetermined first time span, which is sufficient for a reliable disinfection, for example, as a function of an estimated amount of condensate. For example, this time span is determined empirically and stored in control unit 114 or determined by control unit 114 as a function of stored or retrievable additional data, such as the evaporator model code, compressor status and/or the atmospheric humidity.

Consistent with implementations of the present invention, control unit 114 may determine, after passage of the predetermined first time span, a second time span that is sufficient for reducing the ozone, and may continue to hold the air flaps closed at least for this second time span.

Consistent with implementations of the present invention, when the air flaps to the passenger compartment are held closed, control unit 114 may activate a blower of the air conditioning system for a predetermined third time span, when within the passage of the first time span or within the passage of the second time span the condition, under which the air flaps between the air conditioning system and the passenger compartment may remain closed for a prolonged period of time, is no longer met. This condition is no longer met, for example, when control unit 114 receives information that indicates at least a prompt start-up of the vehicle, such as the unlocking of the vehicle doors, the passengers occupying the seats in the passenger compartment, the switching on of the terminal R or the terminal 15, the starting of the internal combustion engine or the switching on of the auxiliary ventilating function, the auxiliary heating function, the auxiliary air conditioning function or the residual heat function.

Consistent with implementations of the present invention, control unit 114 may be constructed in such a manner that ozone generator 112 can be switched on to produce a comparatively small amount of ozone for the protection of the passengers (e.g., about 20 ppb, equivalent to an odor limit), when corresponding information provided to the control unit indicates a condition is met, under which the air flaps between the air conditioning system and the passenger compartment may not remain closed or may not be closed.

Thus, the invention reaches in essence the goal that an effective disinfection is carried out when the vehicle is not running, and a disinfection may also be omitted when the vehicle is running.

In the event that a disinfection is carried out when the vehicle is standing (e.g., without passengers), significantly higher doses of ozone may be employed. The use of complex control systems and the synchronization of the control systems while the vehicle is running cease to be applicable and/or are significantly simplified.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for disinfecting components of an air conditioning system in a motor vehicle, the device comprising:
   an ozone generator arranged in close proximity to an evaporator in the air conditioning system; and
   an electronic control unit configured to activate the ozone generator to produce a comparatively large amount of ozone sufficient to disinfect the evaporator, when information provided to the control unit indicates that a condition is met, under which air flaps between the air conditioning system and a passenger compartment of the motor vehicle may remain closed for a time sufficient for the disinfection, wherein the condition under which the air flaps may remain closed is met when the passenger compartment is in a probable unoccupied state, and wherein the control unit is configured to detect the probable unoccupied state of the passenger compartment.

2. The device of claim 1, wherein the control unit determines that the passenger compartment is in the probable unoccupied state, when at least one of an internal combustion engine and a radio terminal is deactivated.

3. The device of claim 1, wherein the control unit determines that the passenger compartment is in the probable unoccupied state, when a central locking system is activated.

4. The device of claim 1, wherein the control unit determines that the passenger compartment is in the probable unoccupied state, when a seat occupant detection system does not detect passengers.

5. The device of claim 1, wherein the condition, under which the air flaps may remain closed, is met by at least one of a switched-off state of an auxiliary ventilating function, an auxiliary heating function, an auxiliary air conditioning function, and a residual heat function when the internal combustion engine is switched off.

6. The device of claim 1, wherein the condition, under which the air flaps may remain closed, is that auxiliary electric devices may be activated.

7. The device of claim 1, wherein the condition, under which the air flaps may remain closed, is a predetermined clock time.

8. The device of claim 1, wherein, when the air flaps are closed, the control unit induces the production of the ozone for a predetermined first time span.

9. The device of claim 8, wherein the control unit determines, after passage of the predetermined first time span, a second time span sufficient for reducing the ozone, and wherein the control unit causes the air flaps to remain closed for at least the second time span.

10. The device of claim 9, wherein, when the air flaps are closed, the control unit activates a blower of the air conditioning system for a predetermined third time span, when within the passage of the first time span or within the passage of the second time span the condition is no longer met.

11. The device of claim 1, wherein the control unit is configured to control the ozone generator to produce a second amount of ozone less than the first amount, when information provided to the control unit indicates a second condition is met, under which the air flaps between the air conditioning system and the passenger compartment are expected to be open.

12. A method for disinfecting components of an air conditioning system in a motor vehicle, the method comprising the acts of:
determining a condition under which air flaps between the air conditioning system and a passenger compartment of the motor vehicle may remain closed for an amount of time sufficient to disinfect the air conditioning system; and
when the condition is met, inducing a first amount of ozone in the air conditioning system, the first amount of ozone sufficient to disinfect an evaporator of the air conditioning system, wherein determining the condition under which the air flans may remain closed comprises determining that the passenger compartment is in a probable unoccupied state.

13. The method of claim 12, wherein determining that the passenger compartment is in a probable unoccupied state comprises:
determining that at least one of an internal combustion engine and a radio terminal is deactivated.

14. The method of claim 12, wherein determining that the passenger compartment is in a probable unoccupied state comprises:
determining that a central locking system is activated.

15. The method of claim 12, wherein determining that the passenger compartment is in a probable unoccupied state comprises:
determining that a seat occupant detection system does not detect passengers.

16. The method of claim 12, wherein determining a condition under which the air flaps may remain closed comprises:
determining at least one of a switched-off state of an auxiliary ventilating function, an auxiliary heating function, an auxiliary air conditioning function, and a residual heat function when the internal combustion engine is switched off.

17. The method of claim 12, wherein determining a condition under which the air flaps may remain closed comprises:
determining that auxiliary electric devices may be activated.

18. The method of claim 12, wherein determining a condition under which the air flaps may remain closed comprises:
determining that a current clock time is in a predetermined time range.

19. The method of claim 12, further comprising:
when the air flaps are closed, inducing the first amount of ozone in the air conditioning system for a first time span.

20. The method of claim 19, further comprising:
determining, after passage of the first time span, a second time span sufficient for reducing the ozone; and
controlling the air flaps to remain closed for at least the second time span.

21. The method of claim 20, further comprising:
detecting that the condition is no longer met during at least one of the first time span and the second time span; and
activating a blower of the air conditioning system for a predetermined third time span.

22. The method of claim 12, further comprising:
reducing the first amount of ozone to a second amount of ozone less than the first amount, when another condition is present under which the air flaps between the air conditioning system and the passenger compartment are expected to be open.

* * * * *